(12) United States Patent
Bayus et al.

(10) Patent No.: US 7,702,786 B2
(45) Date of Patent: Apr. 20, 2010

(54) TAKING A RESOURCE OFFLINE IN A STORAGE NETWORK

(75) Inventors: Mark Steven Bayus, Tucson, AZ (US); Roger Gregory Hathorn, Tucson, AZ (US); Matthew Joseph Kalos, Tucson, AZ (US); Ashwani Kumar, Tucson, AZ (US); Takashi Suzuki, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1275 days.

(21) Appl. No.: 10/403,310

(22) Filed: Mar. 27, 2003

(65) Prior Publication Data

US 2004/0153702 A1 Aug. 5, 2004

Related U.S. Application Data

(60) Provisional application No. 60/402,376, filed on Aug. 9, 2002.

(51) Int. Cl.
*G06F 15/173* (2006.01)
(52) U.S. Cl. .................. 709/225; 709/223; 709/224; 709/226
(58) Field of Classification Search .......... 709/223–226
See application file for complete search history.

(56) References Cited

U.S. PATENT DOCUMENTS

| | | | | |
|---|---|---|---|---|
| 4,237,533 A * | 12/1980 | Mills et al. | ................ | 713/2 |
| 4,503,535 A | 3/1985 | Budde et al. | | |
| 4,974,147 A | 11/1990 | Hanrahan et al. | | |
| 5,056,091 A | 10/1991 | Hunt | | |
| 5,276,848 A | 1/1994 | Gallagher et al. | | |
| 5,331,673 A | 7/1994 | Elko et al. | | |
| 5,339,405 A | 8/1994 | Elko et al. | | |
| 5,369,570 A * | 11/1994 | Parad | ................ | 705/8 |
| 5,539,875 A | 7/1996 | Elko et al. | | |
| 5,598,541 A * | 1/1997 | Malladi | ................ | 710/106 |
| 5,694,617 A | 12/1997 | Bishop et al. | | |
| 5,793,968 A * | 8/1998 | Gregerson et al. | ........... | 709/209 |
| 5,875,290 A * | 2/1999 | Bartfai et al. | ................. | 714/13 |
| 5,968,116 A * | 10/1999 | Day et al. | ................... | 709/202 |
| 6,021,262 A * | 2/2000 | Cote et al. | ................... | 714/48 |
| 6,101,166 A * | 8/2000 | Baldwin et al. | ............. | 370/222 |
| 6,161,208 A | 12/2000 | Dutton et al. | | |
| 6,175,927 B1 * | 1/2001 | Cromer et al. | ............. | 713/300 |
| 6,304,980 B1 * | 10/2001 | Beardsley et al. | ............. | 714/6 |
| 6,336,193 B1 | 1/2002 | Yudenfriend et al. | | |
| 6,338,145 B1 | 1/2002 | Yudenfriend et al. | | |
| 6,338,151 B1 | 1/2002 | Yudenfriend et al. | | |
| 6,546,498 B1 * | 4/2003 | Saegusa | ........................ | 714/4 |
| 6,571,355 B1 * | 5/2003 | Linnell | ........................ | 714/9 |
| 6,587,962 B1 * | 7/2003 | Hepner et al. | ................. | 714/19 |

(Continued)

OTHER PUBLICATIONS

Rajagopal et al.; IP and ARP over Fibre Channel; Jun. 1999; Network Working Group; RFC 2625.*

*Primary Examiner*—Kenny S Lin
*Assistant Examiner*—Brian P Whipple
(74) *Attorney, Agent, or Firm*—Kunzler & McKenzie

(57) ABSTRACT

Disclosed are a method, apparatus, and computer program product to reduce the detrimental effects of taking resources offline. A resource is taken offline in a storage network by quiescing activity to the resource providing notification that the resource will become unavailable, and taking the resource offline.

18 Claims, 2 Drawing Sheets

U.S. PATENT DOCUMENTS

| | | |
|---|---|---|
| 6,594,786 B1 * | 7/2003 | Connelly et al. ............... 714/50 |
| 6,609,165 B1 * | 8/2003 | Frazier ........................ 710/36 |
| 6,629,156 B1 * | 9/2003 | Odenwald et al. ............... 710/8 |
| 6,643,795 B1 * | 11/2003 | Sicola et al. .................... 714/6 |
| 6,691,184 B2 * | 2/2004 | Odenwald et al. ............. 710/41 |
| 6,888,792 B2 * | 5/2005 | Gronke ....................... 370/227 |
| 6,895,528 B2 * | 5/2005 | Cantwell et al. .............. 714/12 |
| 6,931,440 B1 * | 8/2005 | Blumenau et al. ............ 709/220 |
| 7,036,110 B2 * | 4/2006 | Jeyaraman .................. 717/120 |
| 7,039,827 B2 * | 5/2006 | Meyer et al. ................... 714/4 |
| 7,069,317 B1 * | 6/2006 | Colrain et al. .............. 709/224 |
| 7,085,860 B2 * | 8/2006 | Dugan et al. .................. 710/36 |
| 7,127,633 B1 * | 10/2006 | Olson et al. ..................... 714/4 |
| 7,152,105 B2 * | 12/2006 | McClure et al. ............. 709/224 |
| 7,447,939 B1 * | 11/2008 | Faulkner et al. ................ 714/8 |
| 7,484,021 B2 * | 1/2009 | Rastogi et al. ................ 710/74 |
| 2001/0009014 A1 * | 7/2001 | Savage et al. ............... 709/204 |
| 2001/0034804 A1 * | 10/2001 | Hernandez, III ............ 710/129 |
| 2002/0133601 A1 * | 9/2002 | Kennamer et al. .......... 709/229 |
| 2003/0135782 A1 * | 7/2003 | Matsunami et al. ............. 714/5 |
| 2003/0182459 A1 * | 9/2003 | Jeyaraman .................. 709/310 |
| 2003/0200399 A1 * | 10/2003 | Dawkins et al. ............. 711/152 |

* cited by examiner

TAKING A RESOURCE OFFLINE IN A STORAGE NETWORK

CROSS-REFERENCES TO RELATED APPLICATIONS

This application claims the benefit of U.S. Provisional Application No. 60/402,376, filed on Aug. 9, 2002, which application is incorporated by reference in its entirety.

TECHNICAL FIELD OF THE INVENTION

This invention concerns a system for taking a resource offline in a storage network.

BACKGROUND OF THE INVENTION

A storage area network (SAN) is made up of two primary components: storage systems and a logically isolated network. The storage systems may include disks, tapes, and SAN-management software, that must be SAN-capable. The network may include adapters, wiring, bridges, hubs, switches, and directors. Adapters attach servers and peripherals to the wiring in the network. Bridges are used to convert from one protocol to another. Hubs, switches, and directors provide a central connection point and routing capability. Currently, a large number of SANs utilize fibre channel to provide connections for processors and storage systems on the SAN.

FICON (fiber connection) is a high-speed input/output (I/O) interface for mainframe computer connections to storage devices based on the NCITS fibre channel standard (FC-SB-2), and SANs are available in the market that are based on FICON. FICON products use a mapping layer that is based on the ANSI (American National Standards Institute) X3.230-1994 fibre channel—physical and signaling interface standard (FC-PH) that specifies physical signaling, cabling and transmission speeds for fibre channel. Because FICON is based on the industry-standard fibre channel architecture, the fiber infrastructure and fiber directors of a network can be shared between different types of servers. For example, fiber interfaces can readily be switched between FICON and FCP (Fibre Channel Protocol).

Interface errors (IFCCs) in a FICON enabled SAN may be caused by a resource provides mechanisms needed to transfer data blocks of data end-to-end. FC4 is the highest level layer in the fibre channel standards set. FC4 defines the mapping between the lower level layers of the fibre channel and Upper Layer Protocols such as the IPI and SCSI command sets, the HIPPI data framing, and other ULPs. As a result of the timeouts discussed above, exchanges will be aborted, and errors will be logged.

A fibre channel has potentially hundreds of open exchanges. As a result, use of the above-described method of taking a resource offline provides a potential for causing hundreds of abnormally terminated exchanges. This is problematic because it may result in a perception of poor quality of the SAN, undue service calls, and can drive a large warranty cost to investigate the cause of such errors.

To avoid the problems discussed above, there is a need to eliminate or reduce the detrimental effects of the taking resources offline.

SUMMARY OF THE INVENTION

It is an object of the present invention to provide a method, apparatus, and computer program product to reduce the detrimental effects of taking resources offline. For the present invention, a resource is taken offline in a network by quiescing activity to the resource, providing notification that the resource will become unavailable, and taking the resource offline.

DETAILED DESCRIPTION

In accordance with one or more embodiments of the present invention, errors that occur when a resource is taken offline in a network are eliminated or reduced.

Figure 1:
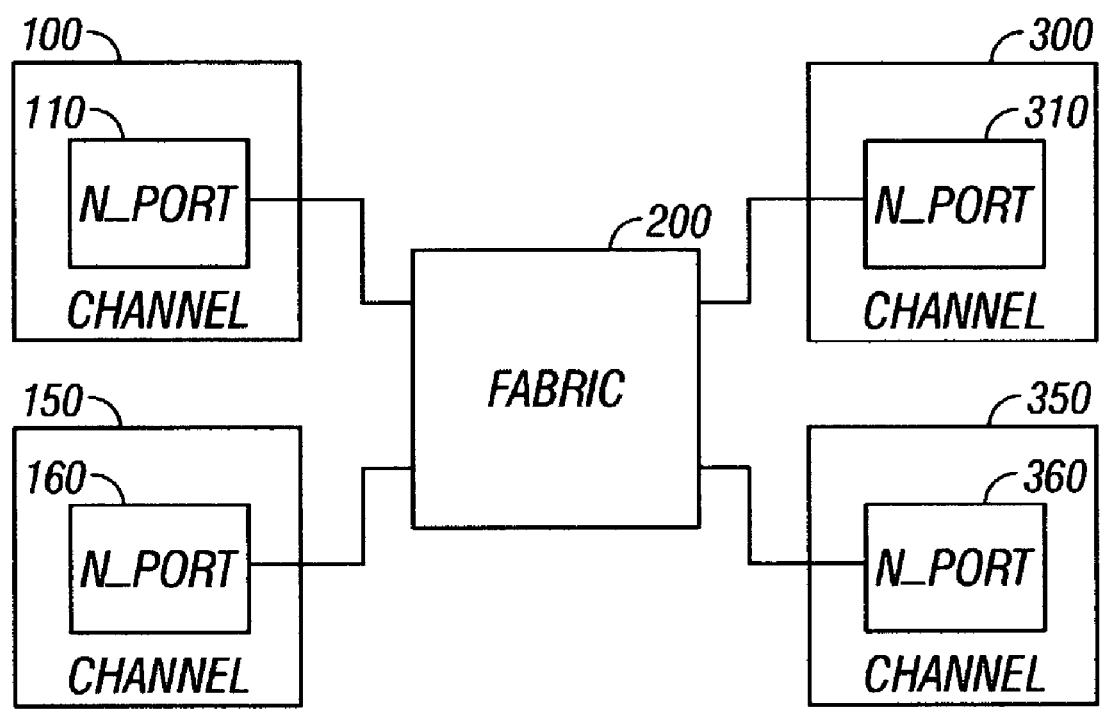
FIG. 1 shows a block diagram of a portion of a fibre channel network.

FIG. 1 shows a block diagram of a portion of a fibre channel storage area network that includes channel 100 with associated N_PORT 110, channel 150 with associated N_PORT 160, fabric 200 (a switch for connecting devices), control unit 300 with associated N_PORT 310 and control unit 350 with associated N_PORT 360. Fibre channel is the general name of an open T11(T11 is the name of the technical committee responsible for device level interfaces) and ANSI (American National Standards Institute) standards-based, block-oriented, serial network protocol. Fibre channel may use both copper and fiber media. A link comprises two unidirectional fibres transmitting in opposite directions with their associated transmitter and receiver. Each fiber is attached to a transmitter of a port at one end, and a receiver of another port at the other end. When a fabric is present in the configuration, the fiber may attach to a node port (N_PORT) and to a port of the fabric (F_PORT).

All equipment that is connected to a fibre channel network must contain at least one fibre channel port. The ports are able to send or receive data under the fibre channel protocol. Each port type has its own characteristics, and is required to connect to a limited set of port types on the other end of the connection to create a valid fibre channel configuration. Fibre channel standards define several types of ports. N_PORTs are the simplest ports. N_PORTS are implemented on servers, storage units and similar devices. An N_PORT may only participate in a point-to-point connection with another N_PORT, or with a F_PORT on a switch. F_PORTs are ports used on a fibre channel switch to connect the fibre channel switch to N_PORTs on nodes. Thus, any port on a node device, (the device may be a disk drive or a personal computer (PC)) is an N_PORT. A port on a fabric is a F_PORT.

A channel is an entity, typically of a host system or computer that includes an N_PORT and elements that perform functions specified by FC-SB-2 (a mapping protocol that maps a particular upper level protocol instance to FC-PH) to provide access to resources by means of control units or emulated control units. In this configuration an example of a resource is an I/O device. A control unit is a physical or emulated entity that includes at least one N_PORT and elements that adapt the characteristics of one or more I/O devices to enable their attachment to a link interface of a channel. In particular, communication over a fibre channel network occurs between a pair of N_PORTs, and depending upon the configuration, the communicating N_PORTs are between a channel and control unit. A resource or device refers to an I/O device such as a direct-access-storage device or a port on an I/O device. Operation of the I/O device is regulated by a control unit that provides logical and buffering capabilities necessary to operate the I/O device.

When a resource in a network is taken offline a control unit associated with that resource is also taken offline, and as a result, an N_PORT associated with that control unit is also taken offline. For the present invention the resource may be a storage device, the associated control unit may be control unit 300 and the N_PORT may be N_PORT 310 shown in FIG. 1.

Figure 2:
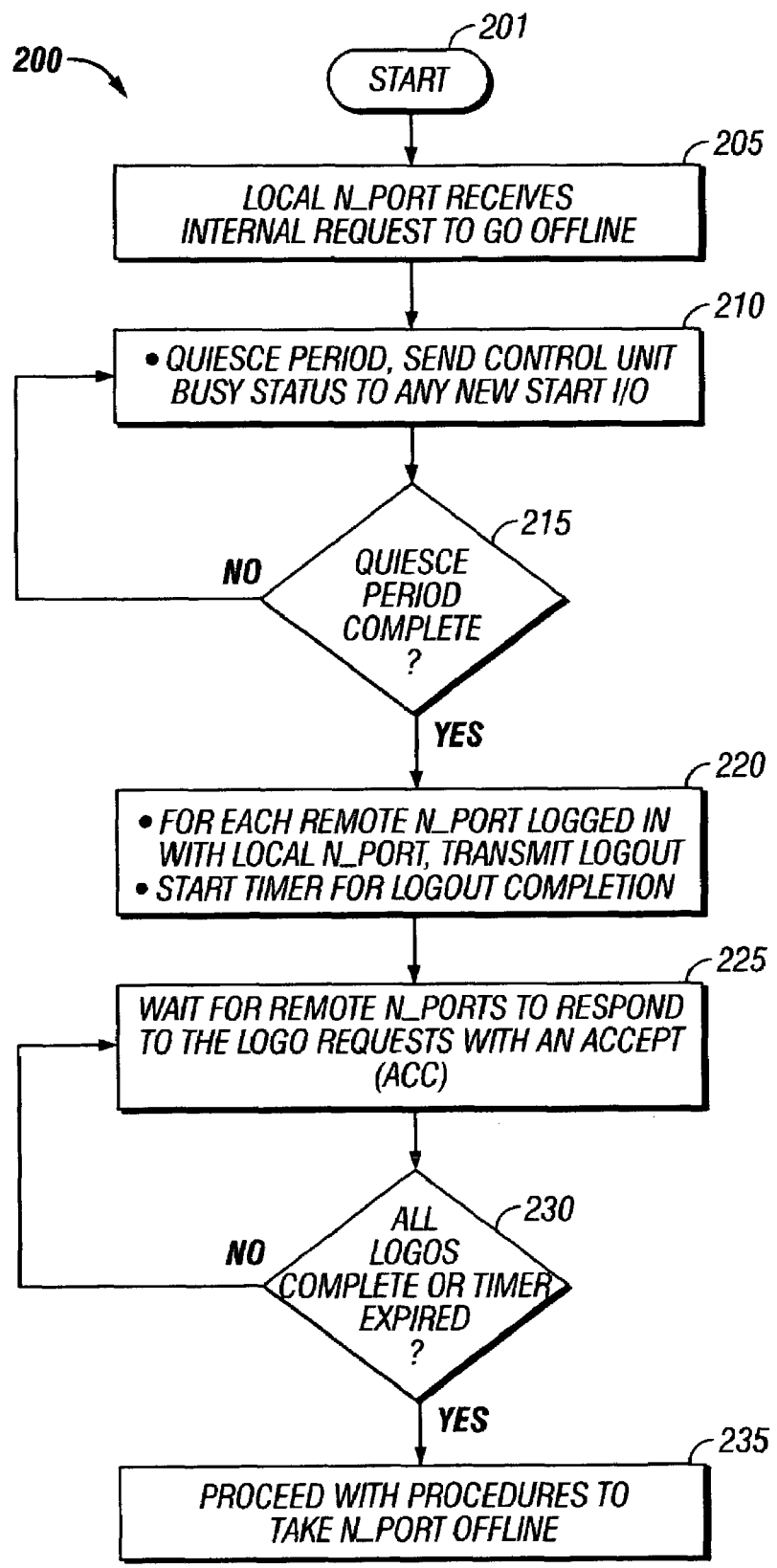
FIG. 2 shows a flowchart of steps of a method for taking a resource offline in a network in accordance with the present invention.

FIG. 2 shows flowchart 200 detailing the steps of a method for taking a resource offline in a network in accordance with one embodiment of the present invention At step 205 of flowchart 200, N_PORT 310's associated resource receives a request from control unit 300 to go offline.

At step 210, in response to the request to go offline, N_PORT 310 quiesces activity to the resource. N_PORT 310 quiesces activity to the resource by quiescing links to N_PORT 310. Quiescing links to N_PORT 310 includes N_PORT 310 completing all channel programs in progress and returning control unit busy status to new commands or control functions other than a system reset command or a purge path command. The FC-SB-2 (fibre channel single-byte command code sets-2 mapping protocol) documentation contains the appropriate information for quiescing links in clause 5.2 that states: "Control units may quiesce the link by completing all channel programs in progress and by returning control unit busy status to new commands or control functions other than a system reset or purge path".

At step 215, N_PORT 310 determines whether the quiescent period has elapsed. A quiescent period timer may be utilized in determining whether quiescent period has elapsed. In accordance with one embodiment of the present invention, the quiescent period is set to be five (5) seconds. In accordance with one such embodiment of the present invention, N_PORT 310 determines whether the quiescent period has elapsed in response to software running on a CPU contained therein, which software can be fabricated routinely by one of ordinary skill in the art without undue experimentation. Alternatively, N_PORT 310 may determine whether the quiescent period has elapsed in response to logic contained therein, which logic can be fabricated routinely by one of ordinary skill in the art without undue experimentation.

If the quiescent period has elapsed, control is transferred to step 220. If the quiescent period has not elapsed, then the system remains in a state of quiescing activity to the resource and determining if the quiescent period has elapsed (step 210 and step 215). During the quiescent period new start I/O commands received from a host system or computer (i.e., an N_PORT in a channel thereof) are not accepted by N_PORT 310. N_PORT 310 responds with a "control unit busy" status to new start I/O commands. Because "control unit end" status is not presented for these logical paths, the host system or computer will not re-drive the start I/O commands. The host system or computer will not re-drive the start I/O commands only for storage control unit N_PORTs that have a method for inhibiting the host system or computer from continuously re-driving commands. A FICON system 390 storage unit running the FICON protocol is an example of a storage control unit with associated N_PORTs that will not continuously re-drive commands. As one can readily appreciate, the embodiments described above for executing step 210 and step 215 of flowchart 200 shown in FIG. 2 provide a means for quiescing activity to the resource.

In accordance with this embodiment of the present invention, the steps described above with respect to step 210 and step 215 advantageously reduce or eliminate the number of open exchanges between the host system or computer and the resource.

At step 220, for each remote N_PORT that has logged into N_PORT 310 using a N_PORT login extended link service (ELS) command (PLOGI ELS command, see Fibre Channel—Single-Byte Command Code Sets-2 Mapping Protocol (FC-SB-2), clause 6.2.2), N_PORT 310 performs a step of initiating an explicit N_PORT logout. An explicit N_PORT logout is accomplished by sending an N_PORT logout extended link service request (LOGO ELS) to the remote N_PORT, and by setting a timer to be utilized in determining whether responses to the explicit N_PORT logouts have been received within a predetermined reply waiting period. LOGO ELS is described in FC-SB-2, clause 6.2.3. For example, in accordance with one embodiment of the present invention, the predetermined reply waiting period is set to be two (2) seconds.

At step 225 N_PORT 310 determines whether the remote N_PORTs have responded to the LOGO ELSs with accept (ACC) ELS replies. After, a predetermined fraction of the predetermined reply waiting period (determined by examining the timer), control is transferred to step 230. As one can readily appreciate, the embodiments described above for executing steps 220 and 225 provide means for providing notification that the resource will become unavailable.

At step 230 the N_PORT 310 determines whether all remote N_PORTs have responded with ACC ELSs to the LOGO ELSs sent by N_PORT 310, or whether the predetermined reply waiting period has elapsed. If all the remote N_PORTs have so responded, or if the predetermined reply waiting period has elapsed, control is transferred to step 235. In accordance with one such embodiment of the present invention, N_PORT 310 executes step 235 in response to software running on a CPU contained therein, which software can be fabricated routinely by one of ordinary skill in the art without undue experimentation. Further, in accordance with one such embodiment, the timer may be contained within the N_PORT, or the timer may be generated utilizing a CPU in accordance with any one of a number of methods that are well known to those of ordinary skill in the art. In accordance with this embodiment of the present invention, the steps described above with respect to step 220, step 225, and decision step 230 provide the remote N_PORTs with a timely indication that N_PORT 310 (i.e., the N_PORT associated with the resource) is going offline. Advantageously, this eliminates a need for a test initialization state procedure that would otherwise be required in a FICON environment.

At step 235 N_PORT 310 proceeds with procedures to take itself offline. For example, in accordance with one or more embodiments, N_PORT 310 transmits an offline primitive sequence (OLS), drops light, drops power, and so forth. In accordance with one such embodiment of the present invention, the local N_PORT carries out this step in response to software running on a CPU contained therein, which software can be fabricated routinely by one of ordinary skill in the art without undue experimentation. Alternatively, the local N_PORT may carry out this step in response to logic contained therein, which logic can be fabricated routinely by one of ordinary skill in the art without undue experimentation. As one can readily appreciate, the embodiments described above for carrying out step 235 provide a means for taking the resource offline.

Because of the receipt of N_PORT LOGO ELSs (and the consequent removal of logical paths), the need for a test initialization state procedure that would otherwise be required in a FICON environment is removed. As a result, the time it takes for initialization state testing in response to the RSCN ELS requests (see the procedure described in the Background of the Invention) is eliminated or reduced. As a consequence, FC2 and FC4 timeouts will be eliminated or reduced, and logged errors will be eliminated or reduced. Advantageously, as a result of utilizing one or more embodiments of the present invention to eliminate or reduce such errors, a perception of poor quality of the SAN, undue service calls, and associated warranty costs can be eliminated or reduced.

In the above description N_PORT 310 was used to illustrate an example of a local N_PORT 310 going offline. Those skilled in the art will recognize that the foregoing description is not limited to N_PORT 310.

Those skilled in the art will recognize that the foregoing description has been presented for the sake of illustration and description only. As such, it is not intended to be exhaustive or to limit the invention to the precise form disclosed. For example, one or more further embodiments of the present invention include a network, for example, and without limitation, a storage area network that utilizes Fibre Channel, that includes software for performing one or more of the above-described embodiments of the present invention, which software can be generated routinely and without undue experimentation by one of ordinary skill in the art in light of the detailed description provided above.

What is claimed is:

1. A method for taking a resource offline in a network performed by a computer-readable medium storing a computer program product used by a programmable computer, the method comprising the steps of:
   receiving a request from a control unit embodied in a resource to take said resource offline, said control unit comprising a fibre channel node port (N_PORT) in communication with a fibre channel network;
   completing channel programs for a host in progress on said resource;
   returning control unit busy status to new commands and control functions while completing the channel programs;
   initiating a fibre channel N_PORT logout for each remote N_PORT logged into said N_PORT by sending a fibre channel N_PORT logout extended link service (LOGO ELS) to said each remote N_PORT;
   receiving a fibre channel accept extended link service (ACC ELS) from said each remote N_PORT logged into said N_PORT; and
   taking said resource offline after each ACC ELS is received from said each remote N_PORT logged into said N_PORT.

2. The method of claim 1, the method further comprising waiting for a predetermined reply waiting period for said each remote N_PORT to respond to said LOGO ELS.

3. The method of claim 2, the step of taking said resource offline proceeding after said predetermined reply waiting period has elapsed.

4. The method of claim 3, wherein said predetermined reply waiting period is two seconds.

5. The method of claim 1, the method further comprising waiting a quiescent period prior to initiating the fibre channel N_PORT logout for each remote N_PORT logged into said N_PORT.

6. The method of claim 5, wherein the quiescent period is five seconds.

7. The method of claim 1, wherein no test initialization state procedure is performed.

8. A network that utilizes fibre channel, comprising:
   a computer-readable medium storing a computer program product;
   a programmable computer using the computer program product, the computer program product comprising
      a means for receiving a request from a control unit embodied in a resource to take said resource offline, said control unit comprising a fibre channel node port (N_PORT) in communication with a fibre channel network;
      a means for completing channel programs for a host in progress on said resource;
      a means for returning control unit busy status to new commands and control functions while completing the channel programs;
      a means for initiating a fibre channel N_PORT logout for each remote N_PORT logged into said N_PORT by sending a fibre channel N_PORT logout extended link service (LOGO ELS) to said each remote N_PORT;
      a means for receiving a fibre channel accept extended link service (ACC ELS) from said each remote N_PORT logged into said N_PORT; and
      a means for taking said resource offline after each ACC ELS is received from said each remote N_PORT logged into said N_PORT.

9. The network of claim 8, the network further comprising a means for waiting a quiescent period prior to initiating the fibre channel N_PORT logout for each remote N_PORT logged into said N_PORT.

10. The network of claim 9, wherein the quiescent period is five seconds.

11. The network of claim 8, wherein the means for taking waits for a predetermined reply waiting period and proceeds taking said resource offline after said predetermined reply waiting period has elapsed, and wherein said predetermined reply waiting period is two seconds.

12. The network of claim 8, wherein no test initialization state procedure is performed.

13. A resource in a network that comprises:
   a computer-readable medium storing a computer program product;
   a programmable computer using the computer program product, the computer program product comprising
      a means for receiving a request from a control unit embodied in a resource to take said resource offline, said control unit comprising a fibre channel node port (N_PORT) in communication with a fibre channel network;
      a means for completing channel programs for a host in progress on said resource;
      a means for returning control unit busy status to new commands and control functions while completing the channel programs;
      a means for initiating a fibre channel N_PORT logout for each remote N_PORT logged into said N_PORT by sending a fibre channel N_PORT logout extended link service (LOGO ELS) to said each remote N_PORT;
      a means for receiving a fibre channel accept extended link service (ACC ELS) from said each remote N_PORT logged into said N_PORT; and
      a means for taking said resource offline after each ACC ELS is received from said each remote N_PORT logged into said N_PORT.

14. The resource of claim 13, said means for initiating comprising a N_PORT.

15. A computer-readable medium storing a computer program product used by a programmable computer, said computer program product having computer readable program code embodied therein that is executed by a CPU for taking a resource offline in a network, comprising:

computer readable program code which causes receiving a request from a control unit embodied in a resource to take said resource offline, said control unit comprising a fibre channel node port (N_PORT) in communication with a fibre channel network;

computer readable program code which causes completing channel programs for a host in progress on said resource;

computer readable program code which causes returning control unit busy status to new commands and control functions while completing the channel programs;

computer readable program code which causes initiating a fibre channel N_PORT logout for each remote N_PORT logged into said N_PORT by sending a fibre channel N_PORT logout extended link service (LOGO ELS) to said each remote N_PORT;

computer readable program code which causes receiving a fibre channel accept extended link service (ACC ELS) from said each remote N_PORT logged into said N_PORT; and computer readable program code which causes the taking of said resource offline after each ACC ELS is received from said each remote N_PORT logged into said N_PORT.

16. The computer-readable storage medium of claim 15, further comprising:

computer readable program code which causes the waiting for a predetermined reply waiting period for said each remote N_PORT to respond to said LOGO ELS.

17. The computer-readable storage medium of claim 16, wherein said predetermined reply waiting period is two seconds and wherein no test initialization state procedure is performed.

18. The computer-readable storage medium of claim 15, the method further comprising computer readable program code which causes waiting a quiescent period prior to initiating the fibre channel N_PORT logout for each remote N_PORT logged into said N_PORT wherein the quiescent period is five seconds.

* * * * *